US012749675B2

(12) United States Patent
Jeong et al.

(10) Patent No.: US 12,749,675 B2
(45) Date of Patent: Sep. 29, 2026

(54) POSITIVE ELECTRODE ACTIVE MATERIAL PRECURSOR FOR SECONDARY BATTERY, POSITIVE ELECTRODE ACTIVE MATERIAL, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Jin Hoo Jeong, Daejeon (KR); Jun Seong Ahn, Daejeon (KR); Myung Gi Jeong, Daejeon (KR); Jun Won Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1045 days.

(21) Appl. No.: 17/793,720

(22) PCT Filed: Jan. 29, 2021

(86) PCT No.: PCT/KR2021/001209
§ 371 (c)(1),
(2) Date: Jul. 19, 2022

(87) PCT Pub. No.: WO2021/154026
PCT Pub. Date: Aug. 5, 2021

(65) Prior Publication Data

US 2023/0087740 A1 Mar. 23, 2023

(30) Foreign Application Priority Data

Jan. 29, 2020 (KR) ........................ 10-2020-0010700

(51) Int. Cl.
*H01M 4/00* (2006.01)
*C01G 53/40* (2025.01)
(Continued)

(52) U.S. Cl.
CPC ............ *H01M 4/366* (2013.01); *C01G 53/40* (2013.01); *C01G 53/50* (2013.01); *H01M 4/505* (2013.01);
(Continued)

(58) Field of Classification Search
CPC ...... H01M 4/366; H01M 4/362; H01M 4/525; H01M 4/505; H01M 4/131; H01M 4/1391; H01M 10/0525
See application file for complete search history.

(56) References Cited

U.S. PATENT DOCUMENTS

2013/0149608 A1* 6/2013 Kim ...................... H01M 4/525
429/223
2014/0158932 A1 6/2014 Sun et al.
(Continued)

FOREIGN PATENT DOCUMENTS

CN 104577096 A 4/2015
CN 107534140 A 1/2018
(Continued)

OTHER PUBLICATIONS

International Search Report for Application No. PCT/KR2021/001209 mailed May 13, 2021, 3 pages. .

*Primary Examiner* — Tiffany Legette
*Assistant Examiner* — Douglas C Marroqin
(74) *Attorney, Agent, or Firm* — Lerner David LLP

(57) ABSTRACT

A positive electrode active material precursor for a secondary battery, which is a secondary particle in which primary particles are aggregated, includes a core portion including nickel (Ni), cobalt (Co), and manganese (Mn), and a shell portion surrounding a surface of the core portion and including nickel (Ni), cobalt (Co), manganese (Mn), and aluminum (Al), wherein the core portion and the shell portion has rod-shaped primary particles, and an average major axis
(Continued)

length of the primary particles of the shell portion is smaller than an average major axis length of the primary particles of the core portion. A method of preparing the positive electrode active material precursor, and a positive electrode active material prepared by using the positive electrode active material precursor are also provided.

10 Claims, 6 Drawing Sheets

(51) Int. Cl.

| | |
|---|---|
| ***C01G 53/50*** | (2025.01) |
| ***H01M 4/36*** | (2006.01) |
| ***H01M 4/505*** | (2010.01) |
| ***H01M 4/525*** | (2010.01) |
| *H01M 4/02* | (2006.01) |

(52) U.S. Cl.
CPC ......... *H01M 4/525* (2013.01); *C01P 2002/52* (2013.01); *C01P 2002/85* (2013.01); *C01P 2004/03* (2013.01); *C01P 2004/04* (2013.01); *C01P 2004/10* (2013.01); *C01P 2004/54* (2013.01); *C01P 2004/61* (2013.01); *C01P 2004/62* (2013.01); *C01P 2004/86* (2013.01); *H01M 2004/021* (2013.01); *H01M 2004/028* (2013.01)

(56) References Cited

U.S. PATENT DOCUMENTS

2014/0377660 A1 12/2014 Fukui et al.
2016/0049647 A1* 2/2016 Park ....................... C01G 53/82 429/209
2016/0190573 A1* 6/2016 Sun ....................... C01G 51/50 429/223
2016/0218350 A1 7/2016 Noh et al.
2016/0336594 A1 11/2016 Ahn et al.
2018/0108940 A1* 4/2018 Kwon .................... C01G 53/50
2018/0145327 A1 5/2018 Zhang et al.
2019/0148721 A1 5/2019 Park et al.
2019/0288285 A1 9/2019 Kim et al.
2020/0152981 A1* 5/2020 Kim ....................... C01G 53/50
2020/0259173 A1 8/2020 Kim et al.
2020/0381719 A1* 12/2020 Park ...................... H01M 4/386
2021/0202941 A1* 7/2021 Kim ...................... H01M 4/505
2022/0006085 A1 1/2022 Kim et al.

FOREIGN PATENT DOCUMENTS

JP 2013147416 A 8/2013
KR 20130138073 A 12/2013
KR 20140092492 A 7/2014
KR 20140126302 A 10/2014
KR 20150016125 A 2/2015
KR 20150125050 A 11/2015
KR 20160039983 A 4/2016
KR 20160129764 A 11/2016
KR 20170017969 A 2/2017
KR 20170063418 A 6/2017
KR 20180063862 A 6/2018
KR 20180099542 A 9/2018
KR 20190057951 A 5/2019
KR 20190088786 A 7/2019
WO 2016204563 A1 12/2016
WO 2019103363 A1 5/2019

* cited by examiner

POSITIVE ELECTRODE ACTIVE MATERIAL PRECURSOR FOR SECONDARY BATTERY, POSITIVE ELECTRODE ACTIVE MATERIAL, AND LITHIUM SECONDARY BATTERY INCLUDING THE POSITIVE ELECTRODE ACTIVE MATERIAL

CROSS-REFERENCE WITH RELATED APPLICATIONS

This application is a national phase entry under 35 U.S.C. § 371 of International Application No. PCT/KR2021/001209, filed on Jan. 29, 2021, which claims priority from Korean Patent Application No. 10-2020-0010700, filed on Jan. 29, 2020, the disclosure of which is incorporated by reference herein.

TECHNICAL FIELD

The present invention relates to a positive electrode active material precursor for a secondary battery, a positive electrode active material, preparation methods thereof, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Among them, the lithium cobalt oxide ($LiCoO_2$) has been widely used because of its high operating voltage and excellent capacity characteristics, and has been used as a positive electrode active material for high voltage. However, due to an increase in the price of cobalt (Co) and supply instability, there is a limitation in using a large amount of the lithium cobalt oxide as a power source for applications such as electric vehicles, and thus, there is a need to develop a positive electrode active material that may replace the lithium cobalt oxide.

Accordingly, a nickel cobalt manganese-based lithium composite transition metal oxide (hereinafter, simply referred to as "NCM-based lithium composite transition metal oxide"), in which a portion of cobalt (Co) is substituted with nickel (Ni) and manganese (Mn), has been developed.

In general, when using an NCM-based positive electrode active material, methods of doping a specific doping element or surface coating are being used to improve battery performance and stability. However, there has been a limit to improving life characteristics and resistance increase of the secondary battery.

PRIOR ART DOCUMENTS (Patent Document 1) Korean Patent Application Laid-Open Publication No. 2017-0063418

DISCLOSURE OF THE INVENTION

Technical Problem

An aspect of the present invention provides a positive electrode active material precursor, which may significantly improve life characteristics and resistance increase when used in a lithium secondary battery, and a method of preparing the same.

Another aspect of the present invention provides a positive electrode active material prepared by using the positive electrode active material precursor, and a secondary battery positive electrode and a lithium secondary battery which include the positive electrode active material.

Technical Solution

According to an aspect of the present invention, there is provided a positive electrode active material precursor for a secondary battery which is a secondary particle in which primary particles are aggregated, wherein the secondary particle includes a core portion including nickel (Ni), cobalt (Co), and manganese (Mn); and a shell portion surrounding a surface of the core portion and including nickel (Ni), cobalt (Co), manganese (Mn), and aluminum (Al), wherein the core portion and the shell portion are composed of rod-shaped primary particles, and an average major axis length of the primary particles of the shell portion is smaller than an average major axis length of the primary particles of the core portion.

According to another aspect of the present invention, there is provided a method of preparing the positive electrode active material precursor for a secondary battery which includes: forming a core portion by a co-precipitation reaction while adding a transition metal-containing solution containing cations of nickel (Ni), cobalt (Co), and manganese (Mn), a basic aqueous solution, and an ammonium solution to a reactor; and forming a shell portion by a co-precipitation reaction while further adding a transition metal-containing solution containing cations of nickel (Ni), cobalt (Co), and manganese (Mn), a basic aqueous solution, an ammonium solution, and an aluminum (Al)-containing solution to the reactor after the formation of the core portion.

According to another aspect of the present invention, there is provided a method of preparing a positive electrode active material for a secondary battery which includes: mixing the positive electrode active material precursor with a lithium source and sintering the mixture to form a lithium transition metal oxide.

According to another aspect of the present invention, there is provided a positive electrode active material for a secondary battery which is in the form of a secondary particle, in which primary particles are aggregated, and includes a lithium transition metal oxide having a composition represented by Formula 3, wherein the lithium transition metal oxide includes a core portion composed of rod-shaped primary particles; and a shell portion which surrounds a surface of the core portion and is composed of spherical primary particles.

$$Li_a[Ni_{x1}Co_{y1}Mn_{z1}Al_{s1}]_{1-b}M^1_bO_2 \quad \text{[Formula 3]}$$

In Formula 3, $M^1$ is at least one selected from the group consisting of zirconium (Zr), boron (B), tungsten (W), magnesium (Mg), cerium (Ce), hafnium (Hf), tantalum (Ta), lanthanum (La), titanium (Ti), strontium (Sr), barium (Ba), fluorine (F), phosphorus (P), and sulfur (S), and $0.8 \leq a \leq 1.2$, $0.7 \leq x1 \leq 0.99$, $0 < y1 < 0.3$, $0 < z1 < 0.3$, and $0.01 \leq s1 \leq 0.1$.

According to another aspect of the present invention, there is provided a positive electrode and a lithium secondary battery which include the positive electrode active material.

Advantageous Effects

A positive electrode active material precursor according to the present invention includes a core portion composed of rod-shaped primary particles having a long major axis length, and a shell portion composed of rod-shaped primary particles having a major axis length shorter than that of the primary particles of the core portion. If a positive electrode active material is prepared by using the above-described positive electrode active material precursor, since the primary particles of the precursor shell portion are transformed into spherical primary particles after sintering to form a shell portion in which small spherical primary particles are randomly aggregated on a surface of the positive electrode active material particle and the primary particles of the core portion, which is composed of the rod-shaped primary particles having a relatively long major axis length, maintain the rod shape even after the sintering, a positive electrode active material including a core portion composed of the rod-shaped primary particles and a shell portion composed of the spherical primary particles may be obtained.

In a case in which the rod-shaped primary particles are included as in the positive electrode active material according to the present invention, since exposure of an energetically stable (003) plane, in which intercalation/deintercalation of lithium ions is not possible, is reduced, structural degradation of the positive electrode active material due to the intercalation/deintercalation of the lithium ions may be suppressed, and, accordingly, an effect of improving life characteristics and resistance characteristics may be obtained. However, in a case in which the entire positive electrode active material is composed of the rod-shaped primary particles, the life characteristics and resistance characteristics are improved, but, since lithium mobility is reduced, there is a limitation in that capacity characteristics and output characteristics are degraded. Thus, in the present invention, since the shell portion composed of small spherical particles with a random orientation is formed on a surface of the positive electrode active material, a specific surface area of the surface of the positive electrode active material is increased to improve the lithium mobility, and thus, the degradation of the capacity characteristics and output characteristics may be minimized.

BEST MODE FOR CARRYING OUT THE INVENTION

Figure 1:
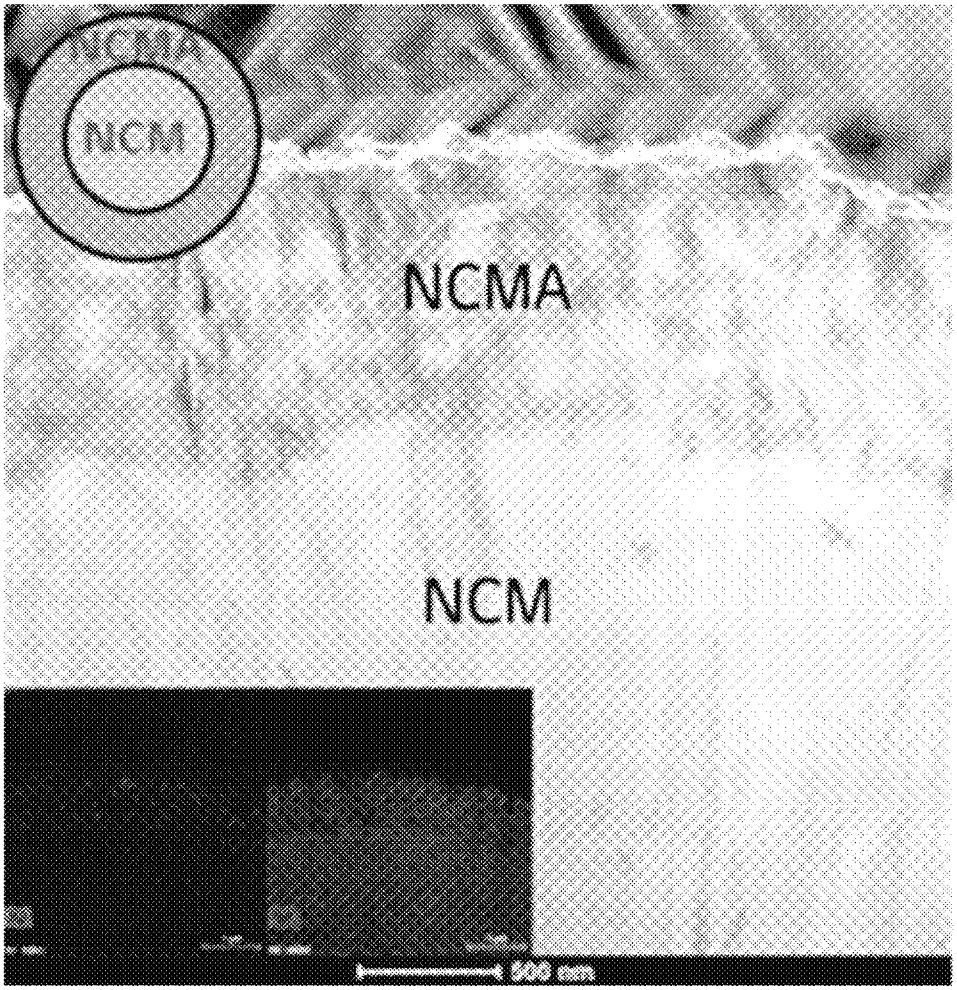
FIG. 1 is cross-sectional transmission electron microscope (TEM) and energy dispersive X-ray (EDX) mapping images of a positive electrode active material precursor prepared in Example 1.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the expression "primary particle" denotes a smallest particle unit which is distinguished as one body when a cross section of a positive electrode active material particle or a positive electrode active material precursor particle is observed through a transmission electron microscope (TEM), wherein it may be composed of a single grain, or may also be composed of a plurality of grains.

In the present invention, the expression "aspect ratio" denotes a ratio of a major axis length to a minor axis length.

In the present invention, average major axis length, aspect ratio, and average particle diameter of the primary particles may be calculated using major axis length, minor axis length, and particle diameter of each primary particle measured in a cross-sectional TEM image of a positive electrode active material particle, and the average value means an arithmetic average value of the measured values.

In the present invention, the expression "secondary particle" denotes a secondary structure formed by aggregation of a plurality of primary particles. An average particle diameter of the secondary particle may be measured using a particle size analyzer, and, in the present invention, Microtrac S3500 was used as the particle size analyzer.

The expression "particle diameter $D_n$" of the positive electrode active material or positive electrode active material precursor in the present invention denotes a particle diameter at n % of cumulative distribution of volume according to the particle diameter. That is, $D_{50}$ is a particle diameter at 50% of the cumulative distribution of volume according to the particle diameter, $D_{90}$ is a particle diameter at 90% of the cumulative distribution of volume according to the particle diameter, and $D_{10}$ is a particle diameter at 10% of the cumulative distribution of volume according to the particle diameter. The $D_n$ may be measured by using a laser diffraction method. Specifically, after dispersing measurement target powder in a dispersion medium (distilled water), the dispersion medium is introduced into a commercial laser diffraction particle size measurement instrument (e.g., Microtrac S3500) and a particle size distribution is calculated by measuring a difference in diffraction patterns due to a particle size when particles pass through a laser beam. The $D_{10}$, $D_{50}$, and $D_{90}$ may be measured by calculating particle diameters at 10%, 50%, and 90% of the cumulative distribution of volume according to the particle diameter using the measurement instrument.

<Positive Electrode Active Material Precursor>

First, a positive electrode active material precursor for a secondary battery according to the present invention will be described.

The positive electrode active material precursor according to the present invention is a secondary particle, in which primary particles are aggregated, and includes a core portion and a shell portion surrounding a surface of the core portion.

In the positive electrode active material precursor of the present invention, the core portion and the shell portion each mean a region composed of rod-shaped primary particles, and a seed portion, in which spherical primary particles are randomly aggregated, may be further included inside the core portion. In a case in which the seed portion is present, the positive electrode active material precursor of the present invention may have a shape in which the seed portion is formed in a center of the particle, a core portion is formed surrounding a surface of the seed portion, and a shell portion is formed surrounding a surface of the core portion.

The core portion includes nickel (Ni), cobalt (Co), and manganese (Mn), and the shell portion includes nickel (Ni), cobalt (Co), manganese (Mn), and aluminum (Al). Specifically, the core portion may be composed of a nickel-cobalt-manganese hydroxide represented by the following [Formula 1], and the shell portion may be composed of a nickel-cobalt-manganese-aluminum hydroxide represented by the following [Formula 2].

$$Ni_{x1}Co_{y1}Mn_{z1}(OH)_2 \quad \text{[Formula 1]}$$

In Formula 1, x1 represents a molar ratio of nickel among total metallic elements, wherein x1 may satisfy $0.7 \le x1 \le 0.98$, $0.8 \le x1 \le 0.98$, $0.85 \le x1 \le 0.98$, or $0.88 \le x1 \le 0.98$.

y1 represents a molar ratio of cobalt among the total metallic elements, wherein y1 may satisfy $0 < y1 < 0.3$, $0.02 \le y1 < 0.3$, $0.02 \le y1 < 0.20$, $0.02 \le y1 < 0.15$, or $0.02 \le y1 < 0.12$.

z1 represents a molar ratio of manganese among the total metallic elements, wherein z1 may satisfy $0 < z1 < 0.3$, $0.02 \le z1 < 0.3$, $0.02 \le z1 < 0.20$, $0.02 \le z1 < 0.15$, or $0.02 \le z1 < 0.12$.

$$Ni_{x2}Co_{y2}Mn_{z2}Al_{s2}(OH)_2 \quad \text{[Formula 2]}$$

In Formula 2, x2 represents a molar ratio of nickel among total metallic elements, wherein x2 may satisfy $0 < x \le 0.95$, $0.5 \le x2 \le 0.95$, $0.7 \le x2 \le 0.95$, $0.8 \le x2 \le 0.95$, or $0.8 \le x2 < 0.88$.

y2 represents a molar ratio of cobalt among the total metallic elements, wherein y2 may satisfy $0 < y2 \le 0.5$, $0.02 \le y2 < 0.3$, or $0.02 \le y2 < 0.20$.

z2 represents a molar ratio of manganese among the total metallic elements, wherein z2 may satisfy $0 < z2 \le 0.5$, $0.02 \le z2 < 0.3$, or $0.02 \le z2 < 0.20$.

s2 represents a molar ratio of aluminum among the total metallic elements, wherein s2 may satisfy $0.05 \le s2 \le 0.5$, $0.05 \le s2 \le 0.2$, or $0.05 \le s2 \le 0.1$.

It is desirable that the positive electrode active material precursor according to the present invention includes aluminum (Al) only in the shell portion. A positive electrode active material precursor is usually prepared by a co-precipitation reaction of a metal solution in which metallic elements, such as nickel, cobalt, manganese, and aluminum, are dissolved in water, wherein, in a case in which a nickel content in the metal solution is high, a crystal structure of the precursor may not grow smoothly due to a difference in co-precipitation conditions between aluminum and nickel. Thus, in the present invention, aluminum was not added during the formation of the core portion, and aluminum was added as a separate solution during the formation of the shell portion to be able to minimize inhibition of crystal growth.

The shell portion may contain aluminum (Al) in an amount of 5 mol % or more, preferably 5 mol % to 50 mol %, and more preferably 5 mol % to 10 mol % based on a total number of moles of total metallic elements included in the shell portion. In a case in which the aluminum (Al) is contained within the above range in the precursor shell portion, the primary particles of the shell portion may be transformed into spherical particles with a random orientation after sintering, and an excellent cycle characteristics (particularly resistance characteristics) improvement effect may be obtained.

The core portion and the shell portion are formed by aggregation of rod-shaped primary particles, and an average major axis length of the primary particles constituting the shell portion is smaller than an average major axis length of the primary particles constituting the core portion.

Specifically, a ratio of the average major axis length of the primary particles of the core portion: the average major axis length of the primary particles of the shell portion may be in a range of 1:1 to 10:1, preferably 3:1 to 8:1, and more preferably 3:1 to 5:1.

For example, the average major axis length of the primary particles of the core portion may be in a range of 300 nm to 1 μm, preferably 350 nm to 950 nm, and more preferably 400 nm to 900 nm. Also, the average major axis length of the primary particles of the shell portion may be in a range of 100 nm to 250 nm, preferably 120 nm to 230 nm, and more preferably 150 nm to 210 nm.

When the average major axis lengths of the primary particles of the core portion and the shell portion satisfy the above range, the primary particles of the core portion after sintering maintain a rod shape, and the primary particles of the shell portion may be transformed into spherical particles. If the average major axis length of the primary particles of the shell portion is excessively large, the rod shape is maintained even after the sintering to reduce an effect of improving capacity and output characteristics, and, if the average major axis length of the primary particles of the core portion is excessively small, an orientation of the primary particles of the core portion may disappear after the sintering to reduce an effect of improving life characteristics.

In a case in which a positive electrode active material is prepared by using the positive electrode active material precursor in which the shell portion composed of the primary particles having a relatively small size is formed on the surface of the particle as described above, since the primary particles of the shell portion are transformed into spherical particles during a sintering process for the preparation of the positive electrode active material, a positive electrode active material is formed in which a shell portion, in which small spherical primary particles are randomly aggregated, is formed on a surface of a positive electrode active material particle. As described above, in a case in which the spherical primary particles are disposed on a surface of the positive electrode active material, a specific surface area of the surface of the positive electrode active material is increased to improve lithium mobility, and, as a result, capacity and charge and discharge efficiency may be increased.

The primary particles in the core portion and the shell portion are rod-shaped primary particles, and, in this case, the primary particles may have an aspect ratio of 3 to 15, preferably 5 to 12, and more preferably 5 to 8. Since the aspect ratio of the primary particle satisfies the above range, life characteristics and resistance increase rate characteristics may be improved.

It is desirable that the primary particles of the core portion are oriented such that a major axis of the primary particle faces a surface direction from a center of the secondary particle, and, for example, the primary particles of the core portion may be radially arranged from the center of the secondary particle in the surface direction. In a case in which the primary particles of the core portion are arranged with an orientation as described above, a movement path of lithium is shortened outside the primary particle to improve the lithium mobility.

A thickness of the shell portion may be 15% or less, preferably 1% to 15%, and more preferably 1% to 10% of an overall diameter of the secondary particle. Specifically, the shell portion may have a thickness of 1 μm or less, preferably 0.5 μm to 1 μm, more preferably 0.5 μm to 0.95 μm, and most preferably 0.6 μm to 0.9 μm. When the shell portion of the positive electrode active material precursor is formed within the above thickness range, since small spherical particles with a random orientation are formed on the surface of the positive electrode active material during sintering, the capacity and charge and discharge efficiency may be increased due to an increase in the specific surface area. If the shell portion is formed excessively thick, since a lithium movement path in the shell portion is increased to reduce the lithium mobility, an effect of increasing the capacity and charge and discharge efficiency is reduced.

Next, a method of preparing the positive electrode active material precursor of the present invention will be described.

The positive electrode active material precursor of the present invention is prepared by a method including the steps of: forming a core portion by a co-precipitation reaction while adding a transition metal-containing solution containing cations of nickel (Ni), cobalt (Co), and manganese (Mn), a basic aqueous solution, and an ammonium solution to a reactor; and forming a shell portion by a co-precipitation reaction while further adding a transition metal-containing solution containing cations of nickel (Ni), cobalt (Co), and manganese (Mn), a basic aqueous solution, an ammonium solution, and an aluminum (Al)-containing solution to the reactor after the formation of the core portion.

The method of preparing the positive electrode active material precursor will be described in detail for each step.

First, a core portion is formed by a co-precipitation reaction while adding a transition metal-containing solution containing cations of nickel (Ni), cobalt (Co), and manganese (Mn), a basic aqueous solution, and an ammonium solution to a reactor.

The transition metal-containing solution, for example, may include a nickel (Ni)-containing raw material, a cobalt (Co)-containing raw material, and a manganese (Mn)-containing raw material.

The nickel (Ni)-containing raw material, for example, may be nickel-containing acetic acid salts, nitrates, sulfates, halides, sulfides, hydroxides, oxides, or oxyhydroxides, and may specifically be $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt (Co)-containing raw material may be cobalt-containing acetic acid salts, nitrates, sulfates, halides, sulfides, hydroxides, oxides, or oxyhydroxides, and may specifically be $Co(OH)_2$, CoOOH, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but the present invention is not limited thereto.

The manganese (Mn)-containing raw material, for example, may be manganese-containing acetic acid salts, nitrates, sulfates, halides, sulfides, hydroxides, oxides, oxyhydroxides, or a combination thereof, and may specifically be a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal-containing solution may be prepared by adding the nickel (Ni)-containing raw material, the cobalt (Co)-containing raw material, and the manganese (Mn)-containing raw material to a solvent, specifically water, or a mixture of water and an organic solvent (e.g., alcohol etc.) which may be uniformly mixed with the water, or may be prepared by mixing an aqueous solution of the nickel (Ni)-containing raw material, an aqueous solution of the cobalt (Co)-containing raw material, and the manganese (Mn)-containing raw material.

The ammonium solution, as a complexing agent, for example, may include $NH_4OH$, $(NH_4)_2SO_4$, $NH_4NO_3$, $NH_4Cl$, $CH_3COONH_4$, $(NH_4)_2CO_3$, or a combination thereof, but the present invention is not limited thereto. The ammonium solution may be used in the form of an aqueous solution, and, in this case, water or a mixture of water and an organic solvent (specifically, alcohol etc.), which may be uniformly mixed with the water, may be used as a solvent.

The basic solution, as a precipitant, may include a hydroxide of alkali metal or alkaline earth metal, such as NaOH, KOH, or $Ca(OH)_2$, a hydrate thereof, or an alkaline compound of a combination thereof. The basic solution may also be used in the form of an aqueous solution, and, in this case, water or a mixture of water and an organic solvent (specifically, alcohol etc.), which may be uniformly mixed with the water, may be used as a solvent.

The basic solution is added to adjust a pH of a reaction solution, wherein the basic solution may be added in an amount such that the pH of the metal solution is in a range of 11 to 13.

The co-precipitation reaction may be performed at a temperature of 40° C. to 70° C. in an inert atmosphere such as nitrogen or argon.

Next, a shell portion is formed by a co-precipitation reaction while further adding a transition metal-containing solution containing cations of nickel (Ni), cobalt (Co), and manganese (Mn), a basic aqueous solution, an ammonium solution, and an aluminum (Al)-containing solution to the reactor after the formation of the core portion.

The aluminum-containing solution includes an aluminum (Al)-containing raw material, and the aluminum (Al)-containing raw material, for example, may be aluminum chloride, aluminum acetate, aluminum sulfate, aluminum nitrate, sodium aluminate, aluminum oxide, aluminum hydroxide, or a combination thereof, but the present invention is not limited thereto.

The aluminum-containing solution may be prepared by adding the aluminum (Al)-containing raw material to a solvent, specifically water, or a mixture of water and an organic solvent (e.g., alcohol etc.) which may be uniformly mixed with the water.

PH, atmosphere, and temperature in the forming of the shell portion may be performed in the same manner as in the formation of the core portion.

Precursor particles having a core portion (NCM)-shell portion (NCMA) of the present invention are formed by the above-described process and precipitated in the reaction solution. The precipitated precursor particles may be separated according to a conventional method and dried to obtain a positive electrode active material precursor.

<Positive Electrode Active Material>

Also, the present invention provides a positive electrode active material which is prepared by using the positive electrode active material precursor according to the present invention.

Specifically, the positive electrode active material may be prepared through a step of mixing the positive electrode active material precursor with a lithium source and sintering the mixture to form a lithium transition metal oxide.

The positive electrode active material precursor is the same as described above.

As the lithium source, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may be $Li_2CO_3$, $LiNO_3$, $LiNO_2$, LiOH, $LiOH \cdot H_2O$, LiH, LiF, LiCl, LiBr, LiI, $CH_3COOLi$, $Li_2O$, $Li_2SO_4$, $CH_3COOLi$, or $Li_3C_6H_5O_7$, and any one thereof or a mixture of two or more thereof may be used.

The positive electrode active material precursor and the lithium source may be mixed and sintered at 730° C. to 830° C. to form a lithium transition metal oxide. Preferably, the sintering may be performed at 750° C. to 810° C., for example, 780° C. to 800° C., and the sintering may be performed for 5 hours to 20 hours, for example, 8 hours to 15 hours.

If necessary, a raw material containing doping element $M^1$ may be further mixed during the sintering. $M^1$, for example, may be at least one selected from the group consisting of zirconium (Zr), boron (B), tungsten (W), magnesium (Mg), cerium (Ce), hafnium (Hf), tantalum (Ta), lanthanum (La), titanium (Ti), strontium (Sr), barium (Ba), fluorine (F), phosphorus (P), and sulfur (S), and the raw material containing the doping element $M^1$ may be $M^1$-containing acetates, nitrates, sulfates, halides, sulfides, hydroxides, oxides, oxyhydroxides, or a combination thereof. In a case in which $M^1$ is additionally mixed during the sintering, since the $M^1$ element is diffused into the lithium transition metal oxide and is doped by the sintering, an effect of improving structural stability of the positive electrode active material may be obtained.

Through the sintering, lithium is intercalated into the positive electrode active material precursor to form a lithium transition metal oxide, and the primary particles constituting the shell portion of the positive electrode active material precursor are converted into spherical primary particles. Since the primary particles constituting the core portion of the positive electrode active material precursor have a longer major axis than the primary particles of the shell portion, the aspect ratio is decreased after the sintering, but the primary particles of the core portion maintain a rod shape.

That is, the positive electrode active material of the present invention, which is prepared by using the positive electrode active material precursor of the present invention, is a secondary particle, in which primary particles are aggregated, and includes a lithium transition metal oxide including a core portion composed of rod-shaped primary particles; and a shell portion which is formed on a surface of the core portion and is composed of spherical primary particles. The positive electrode active material of the present invention may further include a seed portion, in which spherical primary particles are randomly aggregated, inside the core portion.

The spherical primary particles in the shell portion of the positive electrode active material may have an average particle diameter of 100 nm to 500 nm, preferably 120 nm to 480 nm, and more preferably 150 nm to 450 nm. Since the average particle diameter of the primary particles in the shell portion satisfies the above range, the capacity and charge and discharge efficiency may be increased.

The primary particles in the core portion of the positive electrode active material are rod-shaped primary particles, and, in this case, the primary particles may have an aspect ratio of 1.5 to 4.5, for example, 2.5 to 3.5. Since the aspect ratio of the primary particles in the core portion satisfies the above range, life characteristics and resistance increase rate characteristics may be improved.

A thickness of the shell portion of the positive electrode active material may be 15% or less, preferably 1% to 15%, and more preferably 1% to 10% of a diameter of the secondary particle of the positive electrode active material. Specifically, the shell portion of the positive electrode active material may be formed in a thickness of 0.5 μm to 1 μm, preferably 0.5 μm to 0.95 μm, and more preferably 0.6 μm to 0.9 μm. When the shell portion of the positive electrode active material is formed within the above thickness range, the capacity and charge and discharge efficiency may be increased due to an increase in specific surface area of the small spherical particles in the shell portion. If the shell portion is formed excessively thick, since a lithium movement path in the shell portion is increased to reduce the lithium mobility, the effect of increasing the capacity and charge and discharge efficiency is reduced.

An average particle diameter $D_{50}$ of the secondary particle of the positive electrode active material may be in a range of 3 μm to 20 μm, preferably 5 μm to 20 μm, and more preferably 8 μm to 15 μm. When the average particle diameter $D_{50}$ of the secondary particle of the positive electrode active material satisfies the above range, more advantageous effects may be obtained in terms of energy density, life characteristics, and gas generation.

The lithium transition metal oxide may have a composition represented by [Formula 3] below.

$$Li_a[Ni_bCo_cMn_dAl_e]_{1-f}M^1_fO_2 \qquad \text{[Formula 3]}$$

In Formula 3, $M^1$ is a doping element substituted for transition metal sites, and may be at least one selected from the group consisting of Zr, B, W, Mg, Ce, Hf, Ta, La, Ti, Sr, Ba, F, P, and S.

a represents a molar ratio of lithium in the lithium transition metal oxide, wherein a may satisfy $0.8 \le a \le 1.2$, $0.85 \le a \le 1.15$, or $0.9 \le a \le 1.1$.

b represents a molar ratio of nickel based on a total number of moles of transition metals in the lithium transition metal oxide, wherein b may satisfy $0.7 \le b \le 0.99$, $0.8 \le b \le 0.99$, $0.85 \le b \le 0.99$, or $0.85 \le b \le 0.95$.

c represents a molar ratio of cobalt based on the total number of moles of transition metals in the lithium transition metal oxide, wherein c may satisfy $0 < c < 0.3$, $0 < c < 0.2$, $0.01 < c < 0.2$, or $0.01 < c < 0.15$.

d represents a molar ratio of manganese based on the total number of moles of transition metals in the lithium transition metal oxide, wherein d may satisfy $0<d<0.3$, $0<d<0.2$, $0.01<d<0.2$, or $0.01<d<0.15$.

e represents a molar ratio of aluminum based on the total number of moles of transition metals in the lithium transition metal oxide, wherein e may satisfy $0.01 \leq e \leq 0.1$, $0.01 \leq e \leq 0.08$, or $0.01 \leq e \leq 0.05$.

f represents a molar ratio of the doping element M1 doped in a transition metal layer in the lithium transition metal oxide, wherein f may satisfy $0 \leq f \leq 0.1$, $0 \leq f \leq 0.05$, or $0 \leq f \leq 0.03$.

The composition of Formula 3 means an average composition of the entire positive electrode active material, in which the core portion and the shell portion are combined, and compositions of the core portion and the shell portion may be the same or different from each other.

Since the positive electrode active material precursor used in the present invention includes aluminum only in the shell portion and does not includes aluminum in the core portion, compositions of the core portion and the shell portion are different. However, since the aluminum of the shell portion of the positive electrode active material precursor diffuses into the core portion during the sintering process, the metal compositions of the core portion and the shell portion of the positive electrode active material may be different from the metal compositions of the core portion and the shell portion of the positive electrode active material precursor. Specifically, a degree of diffusion of the aluminum varies depending on sintering conditions or an aluminum content of the shell portion, and, accordingly, the core portion and the shell portion of the positive electrode active material may have the same composition or different compositions. In a case in which the compositions of the core portion and the shell portion are different, an aluminum content of the shell portion may be higher than an aluminum content of the core portion.

<Positive Electrode and Lithium Secondary Battery>

According to another embodiment of the present invention, provided are a positive electrode for a secondary battery and a lithium secondary battery which include the positive electrode active material prepared as described above.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a nonwoven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated-EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive agent are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a nonwoven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond, an aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexamethylphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

MODE FOR CARRYING OUT THE INVENTION

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt:manganese was 88:5:7, was added to the reactor at a rate of 510 ml/hr, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When 70 vol % to 75 vol % of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 24 hours to form particles of a core portion having a composition of $[Ni_{0.88}Co_{0.05}Mn_{0.07}](OH)_2$.

Next, a transition metal aqueous solution with a concentration of 2.29 mol/L, in which $NiSO_4$, $CoSO_4$, and $MnSO_4$ were mixed in amounts such that a molar ratio of nickel:cobalt:manganese was 88:5:7, and an $Al(NO_3)_3$ aqueous solution with a concentration of 1.145 mol/L were added to the reactor at rates of 484.5 ml/hr and 51 mL/hr, respectively, addition of an aqueous sodium hydroxide solution was adjusted so that the pH was maintained at 11.4 while a 9 wt % aqueous ammonia solution was continuously added for 16 hours to the reactor at a rate of 510 ml/hr, and thus, a shell portion having a composition of $[Ni_{0.83}Co_{0.05}Mn_{0.07}Al_{0.05}](OH)_2$ was formed on surfaces of the particles of the core portion.

The precursor particles were separated, washed in water, dried in a warm air dryer at 130° C. for 12 hours or more, disintegrated, and sieved to prepare a positive electrode active material precursor.

Example 2

The positive electrode active material precursor prepared in Example 1, LiOH, and $ZrO_2$ were mixed in amounts such that a molar ratio of Ni+Co+Mn+Al:Li:Zr was 1:1.07:0.0015, and sintered at 790° C. for 10 hours in an oxygen atmosphere to prepare a positive electrode active material doped with 1,500 ppm of Zr. Compositions of a core portion and a shell portion of the prepared positive electrode active material were same, and a molar ratio of Ni:Co:Mn:Al was 86:5:7:2.

Example 3

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt:manganese was 92:4:4, was added to the reactor at a rate of 510 ml/hr, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When 70 vol % to 75 vol % of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 24 hours to form particles of a core portion having a composition of $[Ni_{0.92}Co_{0.04}Mn_{0.04}](OH)_2$.

Next, a transition metal aqueous solution with a concentration of 2.29 mol/L, in which $NiSO_4$, $CoSO_4$, and $MnSO_4$ were mixed in amounts such that a molar ratio of nickel:cobalt:manganese was 92:4:4, and an $Al(NO_3)_3$ aqueous solution with a concentration of 1.145 mol/L were added to the reactor at rates of 484.5 ml/hr and 51 mL/hr, respectively, addition of an aqueous sodium hydroxide solution was adjusted so that the pH was maintained at 11.4 while a 9 wt % aqueous ammonia solution was continuously added for 16 hours to the reactor at a rate of 510 ml/hr, and thus, a shell portion having a composition of $[Ni_{0.87}Co_{0.04}Mn_{0.04}Al_{0.05}](OH)_2$ was formed on surfaces of the particles of the core portion.

The precursor particles were separated, washed in water, dried in a warm air dryer at 130° C. for 12 hours or more, disintegrated, and sieved to prepare a positive electrode active material precursor.

Example 4

The positive electrode active material precursor prepared in Example 3, LiOH, and $ZrO_2$ were mixed in amounts such that a molar ratio of Ni+Co+Mn+Al:Li:Zr was 1:1.07:0.0015, and sintered at 730° C. for 10 hours in an oxygen atmosphere to prepare a positive electrode active material doped with 1,500 ppm of Zr.

Compositions of a core portion and a shell portion of the prepared positive electrode active material were same, and a molar ratio of Ni:Co:Mn:Al was 90:4:4:2.

Comparative Example 1

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt:manganese was 88:5:7, and an $Al(NO_3)_3$ aqueous solution with a concentration of 1.145 mol/L were added to the reactor at rates of 500 ml/hr and 20 mL/hr, respectively, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When 70 vol % to 75 vol % of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 40 hours to form precursor particles.

The precursor particles were separated, washed in water, dried in a warm air dryer at 130° C. for 12 hours or more, disintegrated, and sieved to prepare a positive electrode active material precursor having a composition of $[Ni_{0.86}Co_{0.05}Mn_{0.07}Al_{0.02}](OH)_2$.

Comparative Example 2

The positive electrode active material precursor prepared in Comparative Example 1, LiOH, and $ZrO_2$ were mixed in amounts such that a molar ratio of Ni+Co+Mn+Al:Li:Zr was 1:1.07:0.0015, and sintered at 770° C. for 10 hours in an oxygen atmosphere to prepare a positive electrode active material doped with 1,500 ppm of Zr. In a composition of the prepared positive electrode active material, a molar ratio of Ni:Co:Mn:Al was 86:5:7:2.

Comparative Example 3

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt:manganese was 88:5:7, was added to the reactor at a rate of 500 ml/hr, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When 70 vol % to 75 vol % of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 39 hours and 10 minutes to form particles of a core portion having a composition of $[Ni_{0.88}Co_{0.05}Mn_{0.17}](OH)_2$.

In order to form a shell portion with 100 mol % Al, an $Al(NO_3)_3$ aqueous solution with a concentration of 1.145 mol/L was added to the reactor at a rate of 510 mL/hr, addition of an aqueous sodium hydroxide solution was adjusted so that the pH was maintained at 11.0 while a 9 wt % aqueous ammonia solution was continuously added for 96 minutes to the reactor at a rate of 510 ml/hr, and thus, a shell portion was formed on surfaces of the particles of the core portion.

The precursor particles were separated, washed in water, dried in a warm air dryer at 130° C. for 12 hours or more, disintegrated, and sieved to prepare a positive electrode active material precursor.

Comparative Example 4

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt:manganese was 88:5:7, was added to the reactor at a rate of 500 ml/hr, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When the inside of the batch-type reactor was filled to some extent by performing a co-precipitation reaction for 20 hours, the stirring was stopped, the precursor particles were precipitated, and, after removing a supernatant and leaving 4 L of the reactants, the reaction was performed again. The reaction was performed for a total of 39 hours and 10 minutes to form precursor particles having a composition of $[Ni_{0.88}Co_{0.05}Mn_{0.07}](OH)_2$.

The prepared positive electrode active material precursor, LiOH, $Al_2O_3$, and $ZrO_2$ were mixed in amounts such that a molar ratio of Ni+Co+Mn:Li:Al:Zr was 1:1.07:0.02:0.0015, and sintered at 770° C. for 10 hours in an oxygen atmosphere to prepare a positive electrode active material doped with Zr and Al. In the prepared positive electrode active material, a molar ratio of Ni:Co:Mn:Al was 86:5:7:2.

Comparative Example 5

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt:manganese was 92:4:4, was added to the reactor at a rate of 500 ml/hr, an $Al(NO_3)_3$ aqueous solution with a concentration of 1.145 mol/L was added to the reactor at a rate of 20 mL/hr, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When 70 vol % to 75 vol % of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 40 hours to form precursor particles.

The precursor particles were separated, washed in water, dried in a warm air dryer at 130° C. for 12 hours or more, disintegrated, and sieved to prepare a positive electrode active material precursor having a composition of $[Ni_{0.90}Co_{0.04}Mn_{0.04}Al_{0.02}](OH)_2$.

The above-prepared positive electrode active material precursor, LiOH, and $ZrO_2$ were mixed in amounts such that a molar ratio of Ni+Co+Mn+Al:Li:Zr was 1:1.07:0.0015, and sintered at 770° C. for 10 hours in an oxygen atmosphere to prepare a positive electrode active material doped with 1,500 ppm of Zr. In a composition of the prepared positive electrode active material, a molar ratio of Ni:Co:Mn:Al was 90:4:4:2.

Experimental Example 1: Positive Electrode Active Material Precursor and Positive Electrode Active Material Identification The positive electrode active material precursors and the positive electrode active materials of Examples 1, 2, and 4 and Comparative Examples 1 to 3 were identified by transmission electron microscope (TEM) and scanning electron microscope (SEM) images.

FIG. 1 is a cross-sectional TEM image of the positive electrode active material precursor prepared in Example 1, and an image shown in a lower left side is an image of composition distribution of Al and Ni which was measured through energy dispersive X-ray (EDX) mapping. As illustrated in FIG. 1, in the positive electrode active material precursor of Example 1, a shell portion having a thickness of 1 μm or less was formed thinly, and, as illustrated in the EDX mapping, Al ions were detected only in the shell portion.

Figure 2:
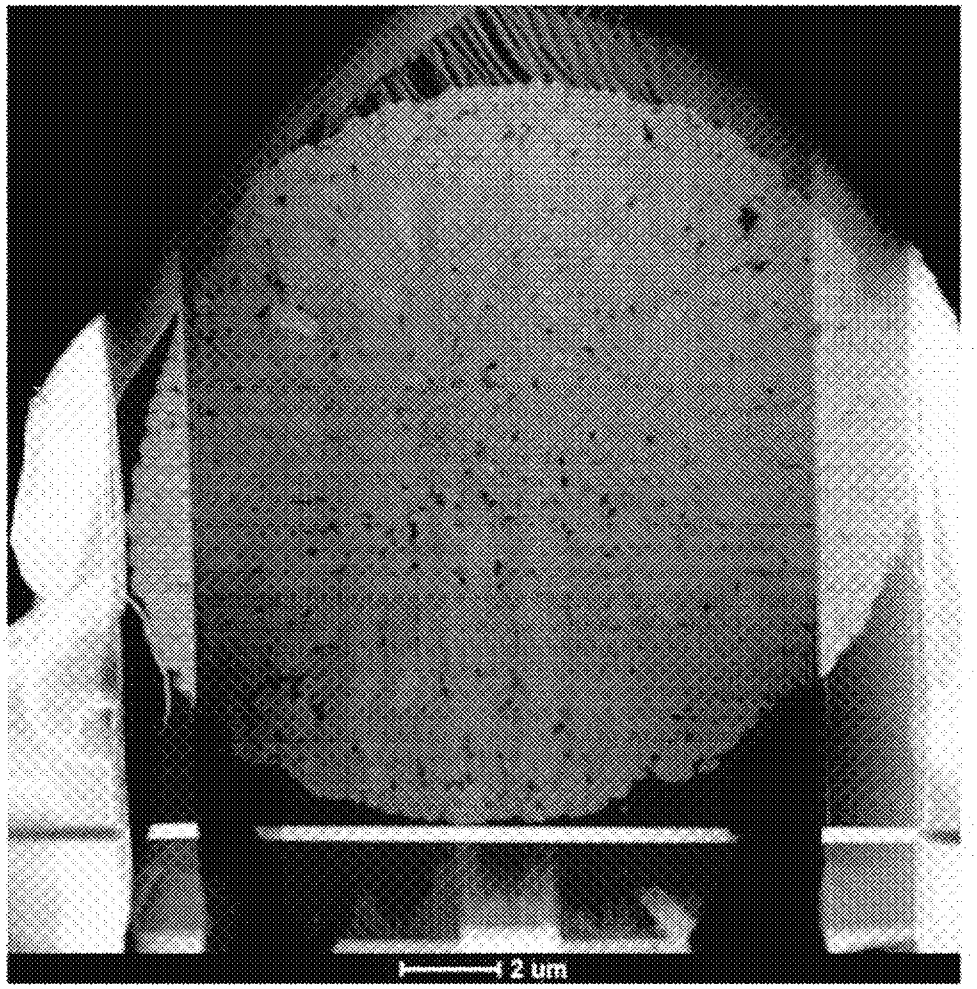
FIG. 2 is a cross-sectional TEM image of a positive electrode active material prepared in Example 2.

FIG. 2 is a cross-sectional TEM image of the positive electrode active material prepared in Example 2. Referring to FIG. 2, with respect to the positive electrode active material of Example 2, it may be confirmed that primary particles in the form of rods were present in the core portion inside a particle, but small spherical particles were randomly aggregated in the shell portion. Also, in the positive electrode active material of Example 2, it may be confirmed that the primary particles of the core portion were oriented such that a major axis faces in a direction from a center of a secondary particle toward a surface thereof, but primary particles of the shell portion were aggregated with a random orientation.

Figure 3:
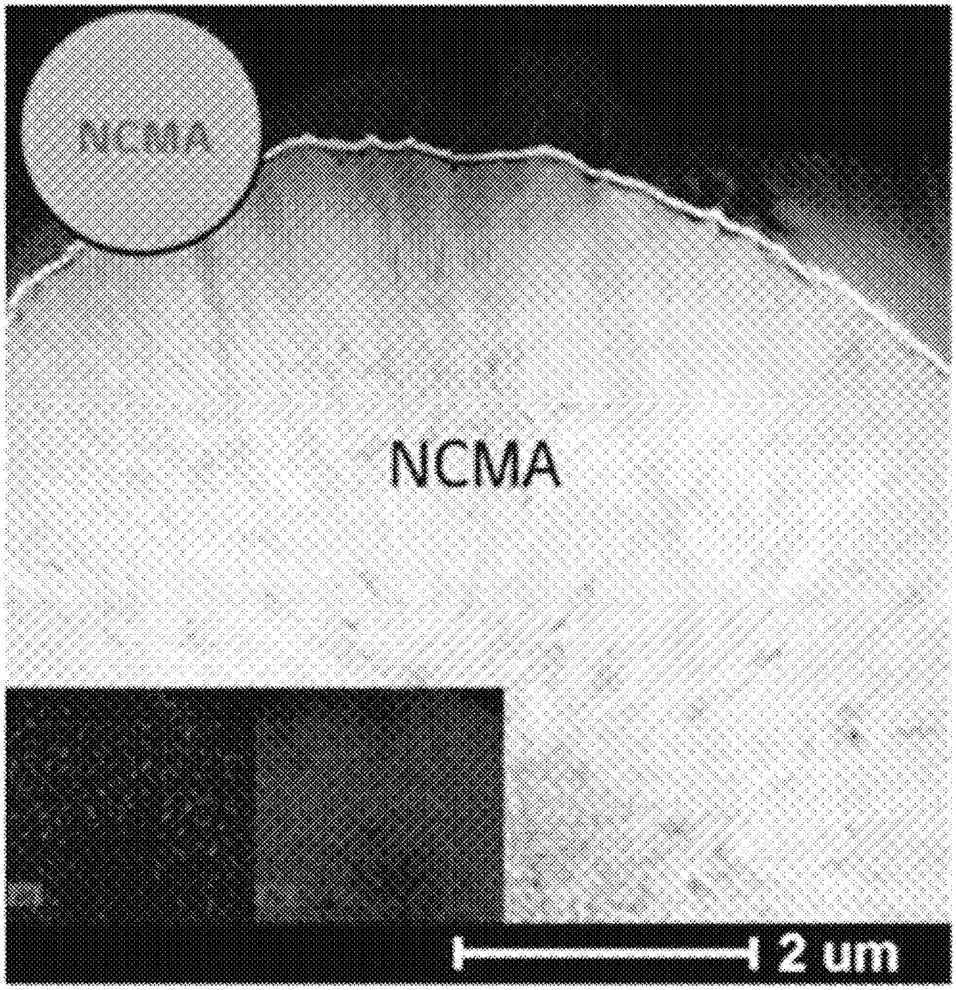
FIG. 3 is cross-sectional TEM and EDX mapping images of a positive electrode active material precursor prepared in Comparative Example 1.

FIG. 3 is a cross-sectional TEM image of the positive electrode active material precursor prepared in Comparative Example 1, and an image shown in a lower left side is an image of composition distribution of Al and Ni which was measured through EDX mapping. Referring to FIG. 3, with respect to the positive electrode active material precursor of Comparative Example 1, it may be confirmed that Ni and Al were uniformly distributed throughout the entire precursor particle, and an interface between the core portion and the shell portion shown in FIG. 1 did not exist.

Figure 4:
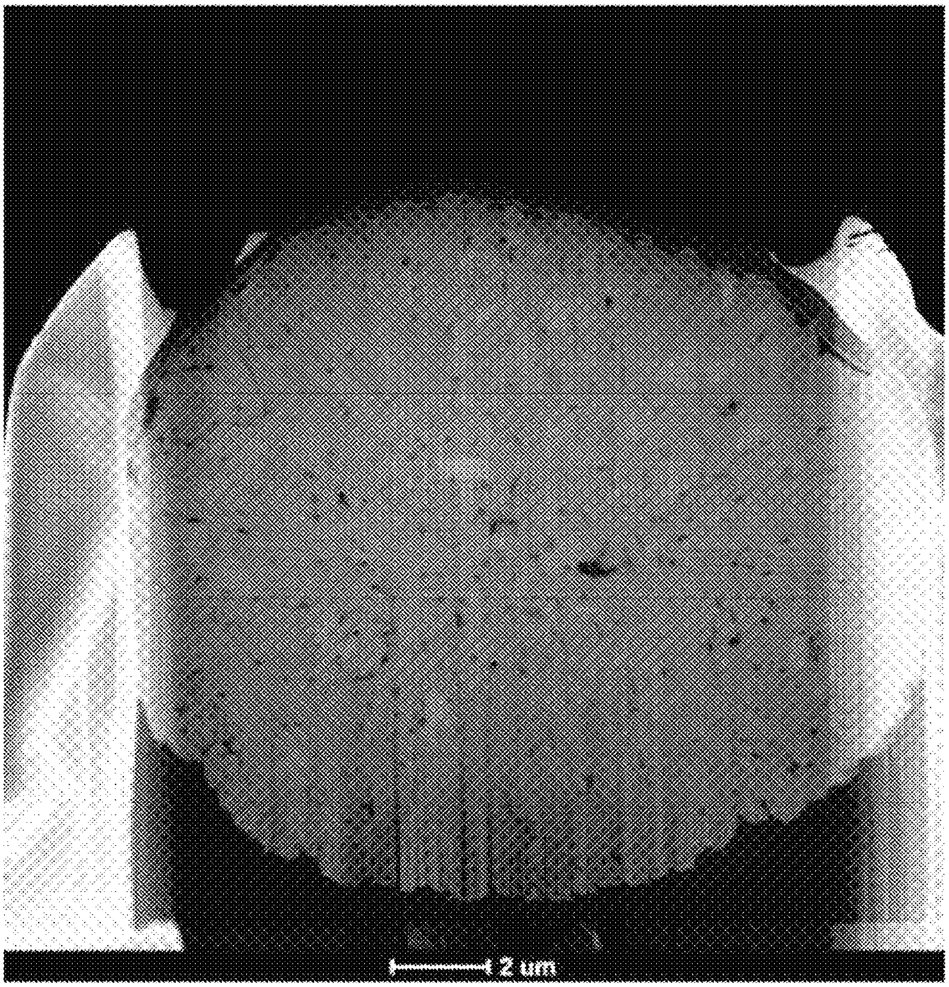
FIG. 4 is a cross-sectional TEM image of a positive electrode active material prepared in Comparative Example 2.

FIG. 4 is a cross-sectional TEM image of the positive electrode active material prepared in Comparative Example 2, and it may be confirmed that primary particles in the form of rods were present as a whole.

Figure 5:
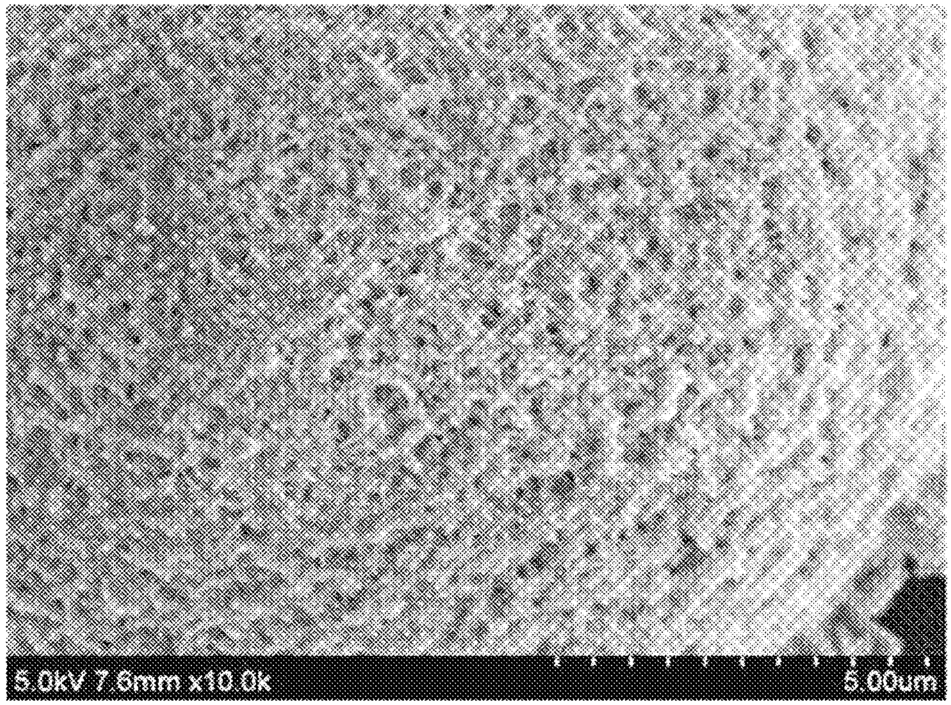
FIG. 5 is a scanning electron microscope (SEM) image of a surface of a positive electrode active material precursor prepared in Comparative Example 3.

FIG. 5 is an SEM image of a surface of the positive electrode active material precursor prepared in Comparative Example 3. Referring to FIG. 5, with respect to the positive electrode active material of Comparative Example 3, it may be confirmed that it had a thin amorphous shape different from a conventional primary particle shape and had low density.

Also, average major axis lengths of the primary particles of the core portions and the shell portions of the precursors, average major axis lengths of the primary particles of the core portions of the positive electrode active materials, and average particle diameters of the primary particles of the shell portions of the positive electrode active materials, which were prepared in the examples and the comparative examples, were measured through TEM analysis. Measurement results are presented in [Table 1] below.

TABLE 1

| | Precursor | | Active material | |
|---|---|---|---|---|
| | Average major axis length of primary particles of core portion (nm) | Average major axis length of primary particles of shell portion (nm) | Average major axis length of primary particles of core portion (nm) | Average particle diameter of primary particles of shell portion (nm) |
| Example 1 | 670 | 200 | — | — |
| Example 2 | — | — | 680 | 220 |
| Example 3 | 620 | 180 | — | — |
| Example 4 | — | — | 610 | 190 |
| Comparative Example 1 | 540 | | — | — |
| Comparative Example 2 | — | — | 480 | |
| Comparative Example 3 | 620 | 20 | — | — |
| Comparative Example 4 | 650 | | 660 | |
| Comparative Example 5 | 610 | | 530 | |

Experimental Example 2: Life Characteristics, Resistance Increase Rate Characteristics Each of the positive electrode active materials prepared in Examples 2 and 4 and Comparative Examples 2, 4, and 5, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 100° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/ethylmethyl carbonate/diethyl carbonate (mixing volume ratio of EC/EMC/DEC=3/4/3).

Each lithium secondary battery cell prepared as described above was charged at a constant current of 0.33 C to 4.25 V at 45° C. and cut-off charged at 3 C. Thereafter, each lithium secondary battery cell was discharged at a constant current of 0.33 C to a voltage of 3.0 V. The charging and discharging behaviors were set as one cycle, and, after this cycle was repeated 100 times and 200 times, capacity retention and resistance increase rate according to cycles were measured. With respect to the capacity retention, its value was calculated by dividing capacity in a 100th cycle or 200th cycle by initial capacity and then multiplying by 100, and, with respect to the resistance increase rate, its value was calculated by dividing resistance in the $100^{th}$ cycle or $200^{th}$ cycle by initial resistance and then multiplying by 100. The results thereof are presented in the following Table 2 and FIG.

TABLE 2

| | 100 cycles (%) | | 200 cycles (%) | |
|---|---|---|---|---|
| | Capacity retention(%) | Resistance increase rate(%) | Capacity retention(%) | Resistance increase rate(%) |
| Example 2 | 95.75 | 14.3 | 93.18 | 22.7 |
| Comparative Example 2 | 94.71 | 14.5 | 91.75 | 23.2 |
| Comparative Example 4 | 94.80 | 15 | 92.11 | 24 |
| Example 4 | 92.9 | 44.7 | 90.2 | 86.7 |
| Comparative Example 5 | 91.3 | 56.8 | 87.8 | 109.5 |

Figure 6:
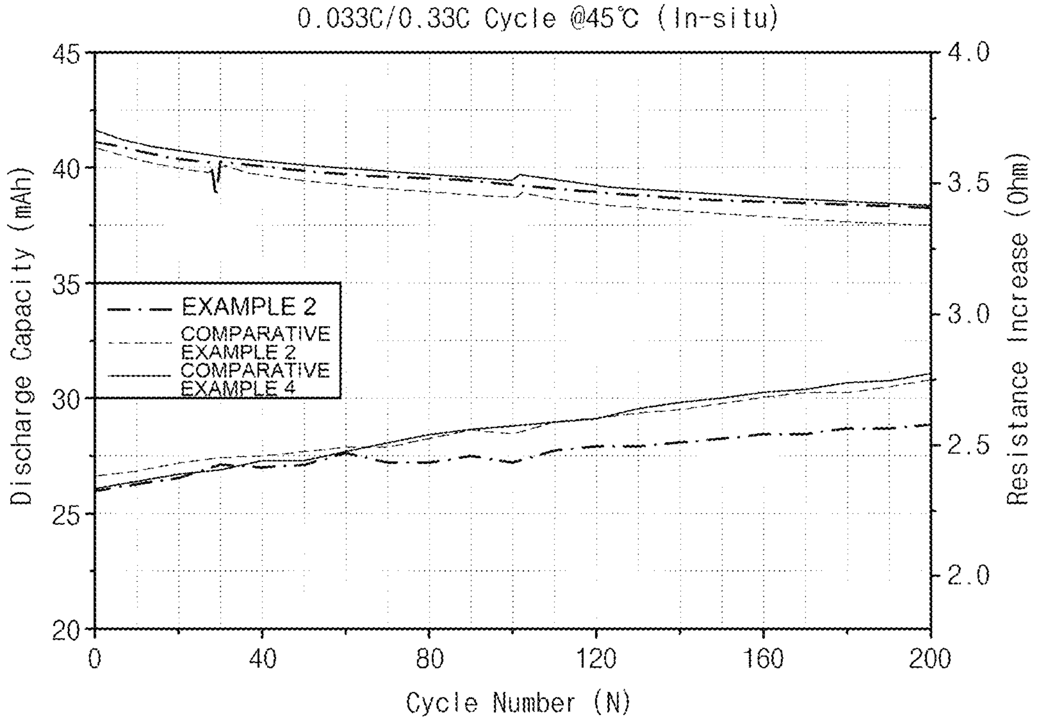
FIG. 6 is a graph illustrating cycle characteristics of lithium secondary batteries respectively using the positive electrode active materials prepared in Example 2 and Comparative Examples 2 and 4.

Referring to Table 2 and FIG. 6, with respect to the secondary battery using the positive electrode active material of Example 2, both capacity retention and resistance increase rate characteristics were better than those of the secondary batteries using the positive electrode active materials of Comparative Examples 2 and 4 having the same composition, and an effect of improving the capacity retention and resistance increase rate was more excellent as the number of cycles was increased. Specifically, the secondary battery using the positive electrode active material prepared in Comparative Example 2 had low capacity retention characteristics, and the secondary battery using the positive electrode active material prepared in Comparative Example 4 exhibited poor resistance increase rate characteristics.

Also, with respect to the secondary battery using the positive electrode active material of Example 4, both capacity retention and resistance increase rate characteristics were better than those of the secondary battery using the positive electrode active material of Comparative Example 5 having the same composition, and the effect of improving the capacity retention and resistance increase rate was more excellent as the number of cycles was increased.

The invention claimed is:

1. A positive electrode active material precursor for a secondary battery, the positive electrode active material precursor which is a secondary particle in which primary particles are aggregated, wherein the secondary particle comprises a core portion including nickel (Ni), cobalt (Co), and manganese (Mn); and a shell portion surrounding a surface of the core portion and including nickel (Ni), cobalt (Co), manganese (Mn), and aluminum (Al), wherein the core portion and the shell portion comprises rod-shaped primary particles, and an average major axis length of the primary particles in the shell portion is smaller than an average major axis length of the primary particles in the core portion, wherein the average major axis length of the primary particles of the core portion is in a range of 300 nm to 1 μm, and wherein the average major axis length of the primary particles of the shell portion is in a range of 100 nm to 250 nm.

2. The positive electrode active material precursor for a secondary battery of claim 1, wherein the shell portion contains aluminum (Al) in an amount of 5 mol % or more based on a total number of moles of total metallic elements.

3. The positive electrode active material precursor for a secondary battery of claim 1, wherein a thickness of the shell portion is 15% or less of an overall diameter of the secondary particle.

4. The positive electrode active material precursor for a secondary battery of claim 1, wherein the shell portion is formed in a thickness of 1 μm or less.

5. The positive electrode active material precursor for a secondary battery of claim 1, wherein an aspect ratio of the primary particles of the core portion and the shell portion is in a range of 3 to 15.

6. The positive electrode active material precursor for a secondary battery of claim 1, wherein the primary particles of the core portion are oriented such that a major axis of the primary particle faces a surface direction from a center of the secondary particle.

7. The positive electrode active material precursor for a secondary battery of claim 1, wherein a ratio of the average major axis length of the primary particles of the core portion: the average major axis length of the primary particles of the shell portion is in a range of 2:1 to 10:1.

8. The positive electrode active material precursor for a secondary battery of claim 1, wherein the core portion comprises a transition metal hydroxide represented by Formula 1, and the shell portion comprises a transition metal hydroxide represented by Formula 2:

$$Ni_{x1}Co_{y1}Mn_{z1}(OH)_2 \quad \text{[Formula 1]}$$

wherein, in Formula 1, $0.7 \le x1 \le 0.98$, $0 < y1 < 0.3$, and $0 < z1 \le 0.3$ $$Ni_{x2}Co_{y2}Mn_{z2}Al_{s2}(OH)_2 \quad \text{[Formula 2]}$$

wherein, in Formula 2, $0 < x2 \le 0.95$, $0 < y2 \le 0.5$, $0 < z2 \le 0.5$, and $0.05 \le s2 \le 0.5$.

9. A method of preparing the positive electrode active material precursor for a secondary battery of claim 1, the method comprising:

forming a core portion by a co-precipitation reaction while adding a transition metal-containing solution containing cations of nickel (Ni), cobalt (Co), and manganese (Mn), a basic aqueous solution, and an ammonium solution to a reactor; and forming a shell portion by a co-precipitation reaction while further adding a transition metal-containing solution containing cations of nickel (Ni), cobalt (Co), and manganese (Mn), a basic aqueous solution, an ammonium solution, and an aluminum (Al)-containing solution to the reactor after the formation of the core portion.

10. A method of preparing a positive electrode active material for a secondary battery, the method comprising mixing the positive electrode active material precursor prepared according to claim 9 with a lithium source to form a mixture and sintering the mixture to form a lithium transition metal oxide.

* * * * *